(12) United States Patent
Tripathy et al.

(10) Patent No.: US 12,536,251 B2
(45) Date of Patent: Jan. 27, 2026

(54) ADAPTIVE LEARNING BASED SYSTEMS AND METHODS FOR OPTIMIZATION OF UNSUPERVISED CLUSTERING

(71) Applicant: Tata Consultancy Services Limited, Mumbai (IN)

(72) Inventors: Saswati Soumya Tripathy, Bangalore (IN); Sayantan Pramanik, Bangalore (IN); Sudhakara Deva Poojary, Mumbai (IN); Pranav Champaklal Shah, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 837 days.

(21) Appl. No.: 17/810,677

(22) Filed: Jul. 5, 2022

(65) Prior Publication Data
US 2023/0071442 A1    Mar. 9, 2023

(30) Foreign Application Priority Data

Jul. 29, 2021   (IN) .............................. 202121034197

(51) Int. Cl.
*G06F 18/2323*    (2023.01)
*G06F 18/20*      (2023.01)
(Continued)

(52) U.S. Cl.
CPC .......... *G06F 18/2323* (2023.01); *G06F 18/22* (2023.01); *G06F 18/29* (2023.01); *G06N 20/00* (2019.01)

(58) Field of Classification Search
CPC ...... G06F 18/22; G06F 18/2323; G06F 18/29; G06N 20/00; G06N 3/0464; G06N 3/088; G06N 3/096; G06N 5/02; G06V 10/7635
See application file for complete search history.

(56) References Cited

U.S. PATENT DOCUMENTS 9,020,271 B2    4/2015  Deolalikar et al.
10,162,794 B1 * 12/2018 Arel ....................... G06N 3/084
(Continued)

OTHER PUBLICATIONS

Wang, Dingkang et al., "An Improved Cost Function for Hierarchical Cluster Trees", Discrete Mathematics, Date: Dec. 2018, Publisher: Arxiv, https://arxiv.org/pdf/1812.02715.pdf.
(Continued)

*Primary Examiner* — Brent Johnston Hoover
(74) *Attorney, Agent, or Firm* — Finnegan, Henderson, Farabow, Garrett & Dunner, LLP

(57) ABSTRACT

This disclosure relates generally to adaptive learning based systems and methods for optimization of unsupervised clustering. The embodiments of present disclosure herein address unresolved problem of involving manual intervention in data preparation, annotating or labelling training data to train classifiers, and taking a number of clusters directly as an input from the users for data classification. The method of the present disclosure provides a fully unsupervised optimized approach for auto clustering of input data that automatically determines the number of clusters for the input data by leveraging concepts of graph theory and maximizing a cost function. The method of present disclosure is capable of handling a new data by continuously and incrementally improving the clusters. The method of present disclosure is domain agnostic, scalable, provides expected level of accuracy for real-world data, and helps in minimizing utilization of powerful processors leading to reduced overall cost.

11 Claims, 2 Drawing Sheets

(51) Int. Cl.
  *G06F 18/22* (2023.01)
  *G06N 20/00* (2019.01)

(56) References Cited

U.S. PATENT DOCUMENTS

2018/0089580 A1* 3/2018 Fu .................. G06F 16/285
2020/0089802 A1* 3/2020 Ronen ............. G06V 40/16
2021/0406779 A1* 12/2021 Hu .................. G06N 3/045

OTHER PUBLICATIONS

Liu, Ming et al., "A Novel Self-Adaptive Clustering Algorithm for Dynamic Data", Neural Information Processing, Date: 2012, pp. 42-49, Publisher: Springer, http://link.springer.com/content/pdf/10.1007/978-3-642-34487-9_6.pdf.

* cited by examiner

ADAPTIVE LEARNING BASED SYSTEMS AND METHODS FOR OPTIMIZATION OF UNSUPERVISED CLUSTERING

PRIORITY CLAIM

This U.S. patent application claims priority under 35 U.S.C. § 119 to: India Application No. 202121034197, filed on Jul. 29, 2021. The entire contents of the aforementioned application are incorporated herein by reference.

TECHNICAL FIELD

The disclosure herein generally relates to unsupervised clustering, and, more particularly, to adaptive learning based systems and methods for optimization of unsupervised clustering.

BACKGROUND

Data classification is a well-defined problem in a growing trend of different enterprise scenarios for providing many application interfaces to automated systems. A few applications among many others are text classification, natural language based speech classification, image classification, and the like. Though, there exist methods for data classification, they require labelling and annotation of data which is a tedious task demanding copious amounts of person-hours. Further, the data is required to be trained and training times when implemented for days may lead to failure of even powerful systems configured with high amounts of RAM, good processors and powerful GPUs also. Thus, conventional systems and methods fail to perform well without adding significant processing overheads.

SUMMARY

Embodiments of the present disclosure present technological improvements as solutions to one or more of the above-mentioned technical problems recognized by the inventors in conventional systems. For example, in one embodiment, an adaptive learning based system for optimization of unsupervised clustering is provided. The system comprising a memory storing instructions; one or more communication interfaces; and one or more hardware processors coupled to the memory via the one or more communication interfaces, wherein the one or more hardware processors are configured by the instructions to: receive, a plurality of incoming input data pertaining to one or more domains, from a user; extract, using one or more machine learning models, a plurality of features from the plurality of incoming input data based on a transfer learning approach; determine, a set of sampled data from the plurality of incoming input data based on an optimization level; obtain, a graph comprising a plurality of nodes and a plurality of edges constructed from the set of sampled data, wherein each of the plurality of nodes represents a sample data comprised in the set of the sampled data and a weight indicative of a first feature similarity metric is assigned to each of the plurality of edges; determine, a first optimal set of clusters for the set of sampled data using a cost function-based thresholding criterion applied on the graph; and assign, each of the plurality of incoming input data to a cluster from the first optimal set of clusters based on a maximum value of a second feature similarity metric.

In an embodiment, step of applying the cost function based thresholding criterion on the graph further comprising: generating, based on a thresholding criterion, a set of thresholded graphs from the graph corresponding to a set of threshold values iterated upon a predefined range with a predefined step-size, wherein the thresholding criterion includes removing a set of edges from the graph which are assigned with a weight less than a pre-selected threshold value; determining, a plurality of subgraphs for each of the thresholded graph from the set of thresholded graphs, based on disconnected subgraph concept of graph theory, wherein the plurality of subgraphs is are disconnected from each other subgraph; computing, using a cost function, a cost score corresponding to each of the plurality of subgraphs for each of the set of thresholded graphs to obtain a final cost score for each of the set of thresholded graphs; identifying a first threshold value from the set of threshold values such that the first threshold value corresponds to a thresholded graph from the set of thresholded graphs having maximum value of the final cost score; and determining the plurality of subgraphs associated with the thresholded graph having maximum value of the final cost score, wherein the plurality of subgraphs is indicative of the first optimal set of clusters.

In an embodiment, the system is further configured by instructions to: determine, by querying a system database, whether a set of incoming input data is a new set of input data based on a comparison of value of a third feature similarity metric with a second threshold value such that the value of the third feature similarity metric is less than the second threshold value for the new set of input data; iteratively perform steps of feature extraction, optimization level based sampling, graph construction and applying the cost function based thresholding criterion on constructed graph for the new set of input data to obtain a second optimal set of clusters; and dynamically update the system database by adaptively learning each information pertaining to the second optimal set of clusters obtained for the new set of input data.

In an embodiment, the first feature similarity metric is computed as an inner product between the plurality of features of a pair of sample data connected to each of the plurality of edges of the graph. In an embodiment, the second feature similarity metric is computed as an inner product of the plurality of features of each of the plurality of incoming input data and a plurality of features of each cluster comprised in the set of clusters. In an embodiment, the third feature similarity metric is computed as an inner product of a plurality of features of each input data comprised in the set of incoming input data and the plurality of features of each cluster comprised in the set of clusters.

In another aspect, a processor implemented method is provided. The method comprising receiving, via one or more hardware processors, a plurality of incoming input data pertaining to one or more domains, from a user; extracting, via one or more hardware processors, using one or more machine learning models, a plurality of features from the plurality of incoming input data based on a transfer learning approach; determining, via one or more hardware processors, a set of sampled data from the plurality of incoming input data based on an optimization level; obtaining, via one or more hardware processors, a graph comprising a plurality of nodes and a plurality of edges constructed from the set of sampled data, wherein each of the plurality of nodes represents a sample data comprised in the set of the sampled data and a weight indicative of a first feature similarity metric is assigned to each of the plurality of edges; determining, via one or more hardware processors, a first optimal set of clusters for the set of sampled data using a cost function-based thresholding criterion applied on the graph; and assigning, via one or more hardware processors, each of the plurality of incoming input data to a cluster from the first optimal set of clusters based on a maximum value of a second feature similarity metric.

In an embodiment, step of applying the cost function based thresholding criterion on the graph further comprising: generating, based on a thresholding criterion, a set of thresholded graphs from the graph corresponding to a set of threshold values iterated upon a predefined range with a predefined step-size, wherein the thresholding criterion includes removing a set of edges from the graph which are assigned with a weight less than a pre-selected threshold value; determining, a plurality of subgraphs for each of the thresholded graph from the set of thresholded graphs, based on disconnected subgraph concept of graph theory, wherein the plurality of subgraphs is are disconnected from each other subgraph; computing, using a cost function, a cost score corresponding to each of the plurality of subgraphs for each of the set of thresholded graphs to obtain a final cost score for each of the set of thresholded graphs; identifying a first threshold value from the set of threshold values such that the first threshold value corresponds to a thresholded graph from the set of thresholded graphs having maximum value of the final cost score; and determining the plurality of subgraphs associated with the thresholded graph having maximum value of the final cost score, wherein the plurality of subgraphs is indicative of the first optimal set of clusters.

In an embodiment, the processor implemented method, further comprising: determining, by querying a system database, whether a set of incoming input data is a new set of input data based on a comparison of value of a third feature similarity metric with a second threshold value such that the value of the third feature similarity metric is less than the second threshold value for the new set of input data; iteratively performing steps of feature extraction, optimization level based sampling, graph construction and applying the cost function based thresholding criterion on constructed graph for the new set of input data to obtain a second optimal set of clusters; and dynamically updating the system database by adaptively learning each information pertaining to the second optimal set of clusters obtained for the new set of input data.

In an embodiment, the first feature similarity metric is computed as an inner product between the plurality of features of a pair of sample data connected to each of the plurality of edges of the graph. In an embodiment, the second feature similarity metric is computed as an inner product of the plurality of features of each of the plurality of incoming input data and a plurality of features of each cluster comprised in the set of clusters. In an embodiment, the third feature similarity metric is computed as an inner product of a plurality of features of each input data comprised in the set of incoming input data and the plurality of features of each cluster comprised in the set of clusters.

In yet another aspect, a non-transitory computer readable medium is provided. The non-transitory computer readable medium comprising: receiving, a plurality of incoming input data pertaining to one or more domains, from a user; extracting, using one or more machine learning models, a plurality of features from the plurality of incoming input data based on a transfer learning approach; determining, a set of sampled data from the plurality of incoming input data based on an optimization level; obtaining, a graph comprising a plurality of nodes and a plurality of edges constructed from the set of sampled data, wherein each of the plurality of nodes represents a sample data comprised in the set of the sampled data and a weight indicative of a first feature similarity metric is assigned to each of the plurality of edges; determining, a first optimal set of clusters for the set of sampled data using a cost function-based thresholding criterion applied on the graph; and assigning, each of the plurality of incoming input data to a cluster from the first optimal set of clusters based on a maximum value of a second feature similarity metric.

In an embodiment, step of applying the cost function based thresholding criterion on the graph further comprising: generating, based on a thresholding criterion, a set of thresholded graphs from the graph corresponding to a set of threshold values iterated upon a predefined range with a predefined step-size, wherein the thresholding criterion includes removing a set of edges from the graph which are assigned with a weight less than a pre-selected threshold value; determining, a plurality of subgraphs for each of the thresholded graph from the set of thresholded graphs, based on disconnected subgraph concept of graph theory, wherein the plurality of subgraphs is are disconnected from each other subgraph; computing, using a cost function, a cost score corresponding to each of the plurality of subgraphs for each of the set of thresholded graphs to obtain a final cost score for each of the set of thresholded graphs; identifying a first threshold value from the set of threshold values such that the first threshold value corresponds to a thresholded graph from the set of thresholded graphs having maximum value of the final cost score; and determining the plurality of subgraphs associated with the thresholded graph having maximum value of the final cost score, wherein the plurality of subgraphs is indicative of the first optimal set of clusters.

In an embodiment, the non-transitory computer readable medium, further comprising: determining, by querying a system database, whether a set of incoming input data is a new set of input data based on a comparison of value of a third feature similarity metric with a second threshold value such that the value of the third feature similarity metric is less than the second threshold value for the new set of input data; iteratively performing steps of feature extraction, optimization level based sampling, graph construction and applying the cost function based thresholding criterion on constructed graph for the new set of input data to obtain a second optimal set of clusters; and dynamically updating the system database by adaptively learning each information pertaining to the second optimal set of clusters obtained for the new set of input data.

In an embodiment, the first feature similarity metric is computed as an inner product between the plurality of features of a pair of sample data connected to each of the plurality of edges of the graph. In an embodiment, the second feature similarity metric is computed as an inner product of the plurality of features of each of the plurality of incoming input data and a plurality of features of each cluster comprised in the set of clusters. In an embodiment, the third feature similarity metric is computed as an inner product of a plurality of features of each input data comprised in the set of incoming input data and the plurality of features of each cluster comprised in the set of clusters.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
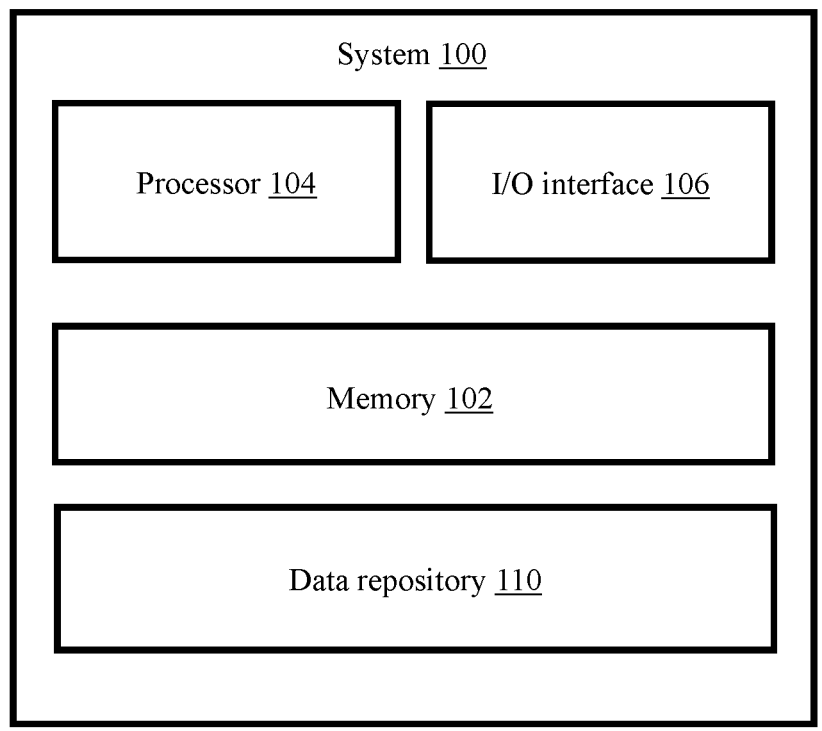
FIG. 1 illustrates an exemplary block diagram of an adaptive learning based system for optimization of unsupervised clustering according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure is directed to adaptive learning based systems and methods for optimization of unsupervised clustering. The typical interpretation of results obtained from conventional clustering methods has been modified to solve a problem of data clustering or grouping from a large collection of data where dependency on user input for identifying number of groups or clusters is eliminated. Traditionally, image classification is done in a supervised manner which requires a lot of data for training a model and the data needs to be labelled or annotated. Labelling and annotation of the data in large volumes may require highly sophisticated systems configured with high amounts of RAM, good processors and powerful GPUs. Unavailability of the highly sophisticated systems may result in longer training times and render a task impossible. Further, conventional methods require selecting a suitable classical machine learning technique or deep learning architecture, or even a combination of them. An improper choice may result in longer runtimes, infinite loops which means absence of convergence and poor results. Since there exist a plethora of classical machine learning techniques and deep learning architectures, decision to select one providing best results is very challenging. Also, selection of proper hyperparameter tuning methods is a challenge. The hyperparameter tuning methods are used to overcome over or underfitting of the model to the training data and achieving faster convergence of training loss. In that context, selection of a proper cost function is of utmost importance in a process. Another limitation of conventional systems and methods include unavailability of requisite amounts of data corresponding to a subset of classes that leads to an inability of the model to appropriately learn features relevant to them. Though there exist several unsupervised clustering techniques also, they require pre-specifying number of clusters prior to running an algorithm. Human precognition based pre-specification of the number of clusters is dangerous and machine based pre-specification used in conventional unsupervised clustering methods require algorithms to run for large numbers, thus adding significant processing overheads. Thus, prevalent methods become impractical.

The present disclosure is directed to a fully unsupervised generic approach for optimized auto-clustering of input data using adaptive learning. The method of the present disclosure performs auto extraction of a plurality of features of the input data using transfer learning. Further, a value of optimization level is provided by a user and a sampling approach is employed to reduce computational overheads while also controlling the number of clusters formed. Through sampling, a subset of data-points is taken from a dataset and a graph is constructed. Thus, by using the sampling approaches, space and time complexity issues are minimized. The concepts of graph theory are leveraged to remove edges from a fully-connected graph, where the edges between pairs of vertices are their pairwise similarity metric. As the similarity metric varies between 0 and 1, complexity of edge-pruning algorithms become independent of number of nodes in a sampled and/or an original graph. Further, an optimal set of clusters is obtained by maximizing a cost function and the input data is assigned to a cluster from the optimal set of clusters. The cost function is developed using concepts of graph theory and transfer learning. Further, the method of present disclosure discusses about iteratively improving clusters over time, based on new data, as and when it arrives. Improvement of the clusters is obtained by taking a decision based approach where it is first checked whether a new data belongs to any of the existing clusters. If not, all of the new data are collected into a single bucket which is fed back as a dataset to the system of the present disclosure. New clusters thus formed are appended to the existing set of clusters. After the method of present disclosure encounters and accounts all the possible data for a domain, the clusters reach a steady state. Unlike conventional methods where the clusters formed are immutable and new data can be accommodated only by performing clustering on combination of new and old datasets leading to increased computation cost, the clusters are iteratively refined based on the new data in the method of present disclosure.

In the context of the present disclosure, the expressions 'data', and 'images' may be used interchangeably. Although further description of the present disclosure is directed to data classification and specifically image classification, it may be noted that the described application is non-limiting and systems and methods of the present disclosure may be applied in any domain, where the data classification is performed on high dimensional data and high classification accuracy is required.

Figure 2:
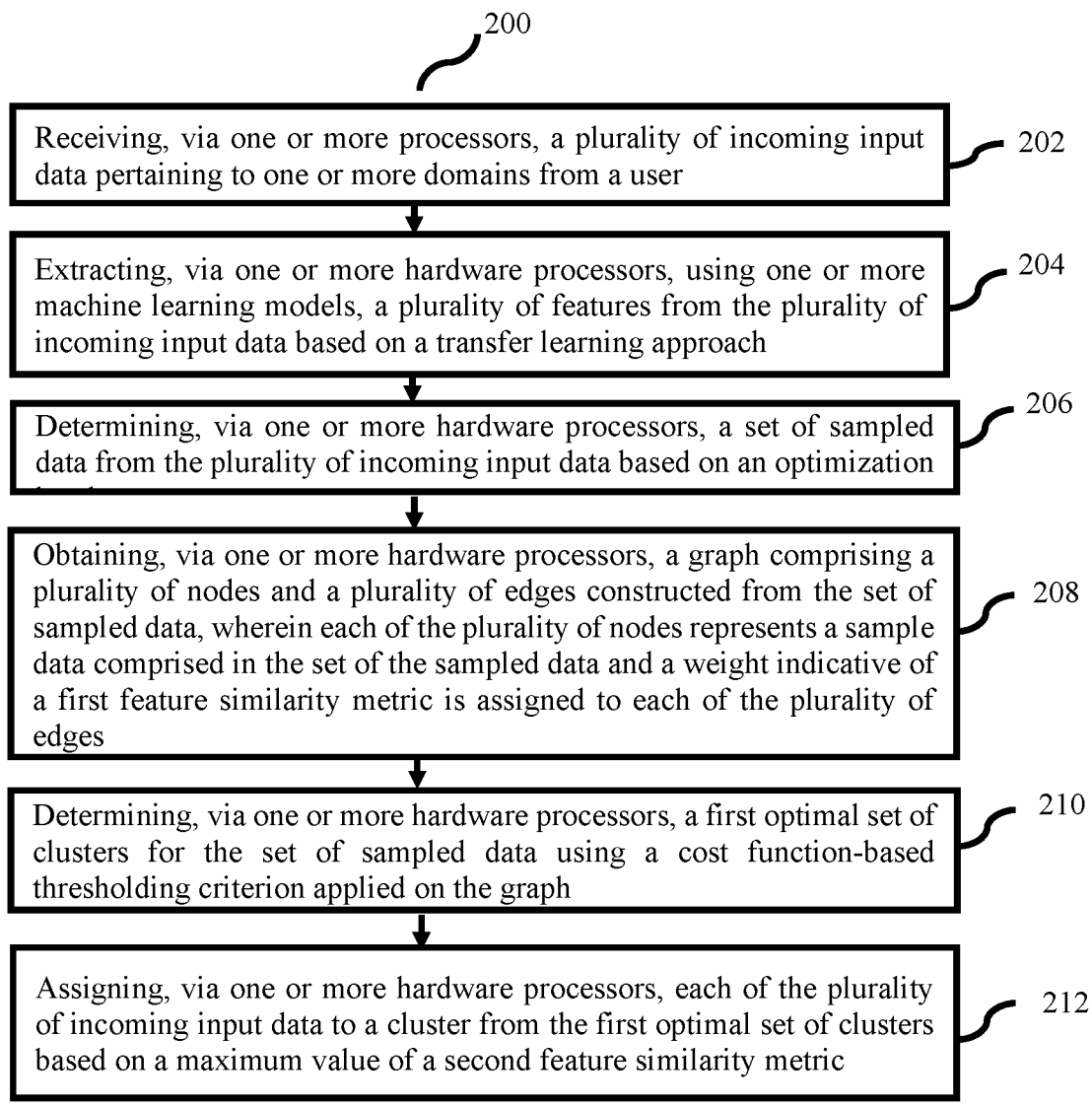
FIG. 2 is an exemplary flow diagram illustrating an adaptive learning based method for optimization of unsupervised clustering according to some embodiments of the present disclosure.

Referring now to the drawings, and more particularly to FIG. 1 and FIG. 2, where similar reference characters denote corresponding features consistently throughout the figures, there are shown preferred embodiments and these embodiments are described in the context of the following exemplary system and/or method.

FIG. 1 illustrates an exemplary block diagram of an adaptive learning based system for optimization of unsupervised clustering according to some embodiments of the present disclosure. In an embodiment, the system 100 includes processor (s) 104, communication interface device (s), alternatively referred as or input/output (I/O) interface(s) 106, and one or more data storage devices or memory 102 operatively coupled to the processor (s) 104. The processor (s) alternatively referred as one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, component modelers, and/or any devices that manipulate signals/inputs based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server. The I/O interface 106, through the ports can be configured to receive inputs stored external to the system 100.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a data repository 110 for storing data processed, received, and generated as output(s) by the system 100.

The data repository 110, amongst other things, includes a system database. In an embodiment, the data repository 110 may be external (not shown) to the system 100 and accessed through the I/O interfaces 106. The memory 102 may further comprise information pertaining to input(s)/output(s) of each step performed by the processor 104 of the system 100 and methods of the present disclosure. In an embodiment, the system database stores information pertaining to inputs fed to the system 100 and/or outputs generated by the system (e.g., at each stage), specific to the methodology described herein. More specifically, the system database stores information being processed at each step of the proposed methodology.

In an embodiment, the one or more hardware processors 104 can be configured to perform an adaptive learning based method for optimization of unsupervised clustering, which can be carried out by using methodology, described in conjunction with FIG. 2, and use case examples.

FIG. 2 is an exemplary flow diagram illustrating an adaptive learning based method for optimization of unsupervised clustering using the system of FIG. 1, according to some embodiments of the present disclosure. In an embodiment, the system 100 comprises one or more data storage devices or the memory 102 operatively coupled to the one or more processors 104 and is configured to store instructions for execution of steps of the method 200 by the one or more processors 104. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200 depicted in FIG. 2, in an embodiment of the present disclosure, at step 202, the one or more hardware processors 104 are configured to receive a plurality of incoming input data pertaining to one or more domains from a user. In an embodiment, the user could be a human, an external automated system or machine or device. In an embodiment, the incoming input data may comprise but are not limited to image, text, speech, video and the like. In an embodiment, the incoming input data is segregated based on the one or more domains and a sequence of receipt. In an embodiment, the one or more domains may include but are not limited to image processing, retail, healthcare, analytics, manufacturing, and/or the like. The received plurality of incoming data is stored in a system database comprised in the data repository 110. Further, the system 100 provides a flexible option to the user to delete and replace any of the one or more domains and allows the user to fetch the plurality of incoming data to the system database from an external storage device. In one typical non-limiting example, a dataset comprising of 1000 images is received as the plurality of incoming input data.

Further, in an embodiment of the present disclosure, at step 204, the one or more hardware processors 104 are configured to extract, using one or more machine learning models, a plurality of features from the plurality of incoming input data based on a transfer learning approach. The step of extracting the plurality of features is used as a pre-processing step. In an embodiment, the one or more machine learning models implemented using the transfer learning approach to extract the plurality of features may include deep learning networks, artificial intelligence based models and or the like. It must be appreciated that the feature extraction based on the transfer learning approach may be performed using any of the state of the art methods. For example, convolutional neural network based pretrained deep learning architecture such as Visual Geometry Group (VGG16), residual networks such as ResNet50, ResNet35, ResNet101, AlexNet, mobileNet, and/or the like may be utilized for feature extraction. In an embodiment, when the incoming input data is an audio, then an extra conversion to spectrogram images is done and same are passed for feature extraction using deep learning methods. Further, when the incoming input data is a video, then frames of the video are extracted prior to applying feature extraction.

Furthermore, in an embodiment of the present disclosure, at step 206, the one or more hardware processors 104 are configured to determine, based on an optimization level, a set of sampled data from the plurality of incoming input data. In an embodiment, the value of the optimization level can be provided by the user or automatically obtained from an external system or the system 100 based on one or more previously learnt values which are stored in the system database comprised in the data repository 110. In an embodiment, the value of the optimisation level lies in a predefined range of [0,10]. In an embodiment, the set of sampled data is a subset of the plurality of the incoming input data which comprises data having significant, useful and optimal information. In an embodiment, the optimization level indicates selection of a percentage of the plurality of incoming input data to provide optimized information. For example, if a dataset of 1000 images is received and an optimization level of 10 is provided, then the set of sampled data comprises 100 images. Here, the 100 sampled images are obtained by eliminating redundant, blurred and other images from the 1000 images that do not carry any significant information. Thus, the 100 sampled images carry the optimal information of the dataset. Since, sampling based on the optimization level provides a reduced dataset with the optimal information, processing time of the system 100 is also reduced and need for computationally expensive processors is minimized.

Referring back to FIG. 2, in an embodiment of the present disclosure, at step 208, the one or more hardware processors 104 are configured to obtain, a graph comprising a plurality of nodes and a plurality of edges constructed from the sampled set of data. In an embodiment, each of the plurality of nodes represents a sample data comprised in the set of the sampled data and a weight indicative of a first feature similarity metric is assigned to each of the plurality of edges. In an embodiment, the first feature similarity metric is computed as an inner product between the plurality of features of a pair of sample data connected to each of the plurality of edges of the graph. In context of present disclosure, the plurality of features of the incoming input data and the samples data could be referred as image features and herein used throughout the discussion. In an embodiment, the inner product may be alternatively referred as a dot product or a cosine similarity. For example, a graph is constructed from 100 images where images form the nodes and the inner products between the pairs of features form the weighted edges between the two nodes. Assuming, G is a graph with vertices given by $V_G$ which are representing the images and edges are given by $E_G$. The weight of the edge between pair of vertices j and k is given by $(E_G^{(j,k)})$ which is calculated as the inner product of the plurality of features extracted from the images, such that $(E_G^{(j,k)}) = \langle f_j, f_k \rangle$, where $f_j$ is a feature vector extracted from $j^{th}$ image and $f_k$ is a feature vector extracted from $k^{th}$ image.

Further, in an embodiment of the present disclosure, at step 210, the one or more hardware processors 104 are configured to determine, using a cost function-based thresholding criterion applied on the graph, a first optimal set of clusters for the set of sampled data. In an embodiment, the cost function-based thresholding criterion applied on the graph further comprising generating, based on a thresholding criterion, a set of thresholded graphs from the graph corresponding to a set of threshold values iterated upon a predefined range with a predefined step-size. In an embodiment of the present disclosure, the set of threshold values is iterated upon a predefined range of 0 to 1 with a predefined step-size of 0.01. In an embodiment, the thresholding criterion includes removing a set of edges from the graph which are assigned with a weight less than a pre-estimated threshold value. This step is further explained with the help of a non-limiting example. For example, it is assumed that initially a threshold value of 0.01 is selected from the set of threshold values and a thresholded graph given by $\overline{G}_1$ is obtained from the graph G corresponding to the threshold value of 0.01 by removing the edges of the graph G having weight less than 0.01. In a similar way, a set of thresholded graphs represented by $\{G_1, G_2, G_3 \ldots G_n\}$ is generated for the threshold values of 0.01, 0.02 till the threshold value of 1. Further, in an embodiment of the present disclosure, the one or more hardware processors 104 are configured to determine a plurality of subgraphs for each of the set of thresholded graphs based on disconnected subgraph concept of graph theory. Here, the plurality of subgraphs is disconnected from each other. For example, for the thresholded graph $\overline{G}_1$, the plurality of subgraphs is given by $\{C_1, C_2, C_3 \ldots C_m\}$. Furthermore, in an embodiment of the present disclosure, the one or more hardware processors 104 are configured to compute, using a cost function, a cost score corresponding to each of the plurality of subgraphs for each of the set of thresholded graphs to obtain a final cost score for each of the set of thresholded graphs. In an embodiment, the final cost score for each of the set of thresholded graphs indicates an overall score generated by adding individual cost score of each of the plurality of subgraphs of each of the set of thresholded graphs. The cost function to calculate the cost score for a subgraph $C_i$ is provided in equation (1) below.

$$\text{Cost Score} = \left\{ \sum_{i=1}^{m} \left( \sum_{j=1}^{n_i} \sum_{k=1}^{n_i} \frac{\langle f_j, f_k \rangle}{n_i^2} \right) - m \right\}^2 \quad (1)$$

Here, $n_i$ denotes number of nodes in $C_i$, j and k represent the nodes in $C_i$ and $(E_G^{(j,k)})$ represents the weight assigned to an edge between nodes j and k in the graph G.

Further, in an embodiment of the present disclosure, the one or more hardware processors 104 are configured to identify a first threshold value from the set of threshold values such that the first threshold value corresponds to a thresholded graph from the set of thresholded graphs having maximum value of the final cost score. Table 1 provides cost score corresponding to each of the plurality of subgraphs for each of the set of thresholded graphs and the final cost score for each of the set of thresholded graphs.

TABLE 1

| Threshold value | Thresholded Graph | subgraphs | Subgraph cost score | Final cost score |
|---|---|---|---|---|
| 0.01 | $\overline{G}_2$ | $C_1$ | 20 | 50 |
|  |  | $C_2$ | 30 |  |
| 0.02 | $\overline{G}_2$ | $C_1$ | 10 | 70 |
|  |  | $C_2$ | 40 |  |
|  |  | $C_3$ | 20 |  |
| 0.03 | $\overline{G}_3$ | $C_1$ | 30 | 65 |
|  |  | $C_2$ | 20 |  |
|  |  | $C_3$ | 15 |  |
| 0.04 | $\overline{G}_4$ | $C_1$ | 25 | 81 |
|  |  | $C_2$ | 40 |  |
|  |  | $C_3$ | 16 |  |

As can be seen in Table 1, the final cost score for the thresholded graph $\overline{G}_4$ is maximum, thus the identified first threshold value is 0.04. In an embodiment of the present disclosure, the one or more hardware processors 104 are further configured to determine the plurality of subgraphs associated with the thresholded graph having maximum value of the final cost score. Here, the plurality of subgraphs which are determined are indicative of the first optimal set of clusters. In an embodiment, the user may utilize the optimization level to control the number of clusters where the number of clusters is low when the optimization level is high.

Referring back to FIG. 2, in an embodiment of the present disclosure, at step 212, the one or more hardware processors 104 are configured to assign, based on a maximum value of a second feature similarity metric, each of the plurality of incoming input data to a cluster from the first optimal set of clusters. In an embodiment, the second feature similarity metric is computed as an inner product of the plurality of features of each of the plurality of incoming input data and a plurality of features of each cluster comprised in the set of clusters. In an embodiment, the plurality of features of each cluster may be alternatively referred as cluster features. In other words, the second feature similarity metric is indicative of a cosine similarity between the image features and cluster features. In other words, an image from an image dataset is assigned to a cluster with which it has highest cosine similarity. In an embodiment, cluster features of each cluster are stored in the system database comprised in the data repository 110. In an embodiment, the cluster features may include but not limited to a cluster centroid which indicates feature wise mean of all images in each cluster.

In an embodiment of the present disclosure, the one or more hardware processors 104 are further configured to determine, by querying the system database, whether a set of incoming input data is a new set of input data based on a comparison of value of a third feature similarity metric with a second threshold value such that the value of the third feature similarity metric is less than the second threshold value. In an embodiment, the second threshold refers to a saddle point of a matrix obtained by calculating the inner product of the plurality of incoming input data and the plurality of plurality of features of each cluster comprised in the set of clusters. For example, if M clusters and their centroids have been identified for N input images, the inner product of the N input images with respective cluster centroids is calculated to obtain a M×N matrix of inner products. The saddle point of the matrix is found which is the used as the second threshold value In an embodiment, the third feature similarity metric is computed as an inner product of a plurality of features of each input data comprised in the set of incoming input data and the plurality of features of each cluster comprised in the set of clusters. In an embodiment, the set of incoming input data could be different from the plurality of the incoming input data. Previously the dataset of 1000 images was considered. However, in an example, the set of incoming input data may represent a different dataset of 200 images. Further, it is assumed that the first optimal set of clusters which is obtained for the dataset of 1000 images has 15 clusters. The set of incoming input data is pre-processed for feature extraction to extract features of 200 images. In an embodiment, the inner product of features of 200 images and the cluster features of existing and stored clusters which is 15 in this case is computed. If the computed inner product of an image from the dataset of 200 images is above the second threshold value, then the image is assigned to the cluster with which it has the highest similarity. However, when the computed inner product of an image from the dataset of 200 images is less than the second threshold value, then the image is identified as a new image. For example, if in the dataset of 200 images, the third feature similarity metric is higher than the second threshold value for 137 images and lower for remaining 63 images, then the remaining 63 images are identified as new images.

In an embodiment of the present disclosure, the one or more hardware processors are configured to iteratively perform iteratively perform steps of feature extraction, optimization level based sampling, graph construction and applying the cost function based thresholding criterion on constructed graph for the new set of input data to obtain a second optimal set of clusters. In an embodiment, the second optimal set of clusters is different from the first optimal set of clusters. For example, four new clusters are identified for the new set of input data which comprises 63 images. In an embodiment of the present disclosure, the one or more hardware processors 104 are configured to dynamically update the system database by adaptively learning each information pertaining to the second optimal set of clusters obtained for the new set of input data. In other words, the clusters obtained for the new set of input data are appended to the existing or the stored clusters.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of involving manual intervention in data preparation, annotating or labelling training data to train classifiers, and taking the number of clusters directly as an input from the users for data classification. The method of the present disclosure is a fully unsupervised method that automatically determines the number of clusters (groups) using a cost function. The method of present disclosure is capable of handling new data by continuously and incrementally improving the clusters. The method of present disclosure is domain agnostic, scalable, provides expected level of accuracy for the real-world data, and helps in minimizing the utilization of powerful processors leading to reduced overall cost.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:
   receiving, via one or more hardware processors, a plurality of incoming input data pertaining to one or more domains, from a user;
   extracting, via one or more hardware processors, using one or more machine learning models, a plurality of features from the plurality of incoming input data based on a transfer learning approach, wherein the plurality of features of the incoming input data are image features from an images data set, an audio and a video,
      wherein when the incoming input data is the audio, then the audio is converted to spectrogram images and passed for feature extraction using a deep learning method,
      wherein when the incoming input data is the video, then frames of the video are extracted prior to applying feature extraction;
   determining, via one or more hardware processors, a set of sampled data from the plurality of incoming input data based on an optimization level, wherein the set of sampled data provides a reduced dataset, reduce a processing time of the hardware processors;
   obtaining, via one or more hardware processors, a graph comprising a plurality of nodes and a plurality of edges constructed from the set of sampled data, wherein each of the plurality of nodes represents a sample data comprised in the set of the sampled data and a weight indicative of a first feature similarity metric is assigned to each of the plurality of edges;
   determining, via one or more hardware processors, a first optimal set of clusters for the set of sampled data using a cost function-based thresholding criterion applied on the graph, wherein step of applying the cost function based thresholding criterion on the graph further comprising:
      generating, based on a thresholding criterion, a set of thresholded graphs from the graph corresponding to a set of threshold values iterated upon a predefined range with a predefined step-size, wherein the thresholding criterion includes removing a set of edges from the graph which are assigned with a weight less than a pre-selected threshold value;
      determining, a plurality of subgraphs for each of the thresholded graphs from the set of thresholded graphs, based on disconnected subgraph concept of graph theory, wherein the plurality of subgraphs are disconnected from each other subgraph;
      computing, using a cost function, a cost score corresponding to each of the plurality of subgraphs for each of the set of thresholded graphs to obtain a final cost score for each of the set of thresholded graphs;
      identifying a first threshold value from the set of threshold values such that the first threshold value corresponds to a thresholded graph from the set of thresholded graphs having maximum value of the final cost score; and
      determining the plurality of subgraphs associated with the thresholded graph having maximum value of the final cost score, wherein the plurality of subgraphs are indicative of the first optimal set of clusters; and
   assigning, via one or more hardware processors, each of the plurality of incoming input data to a cluster from the first optimal set of clusters based on a maximum value of a second feature similarity metric.

2. The processor implemented method of claim 1, further comprising:
   determining, by querying a system database, whether a set of incoming input data is a new set of input data based on a comparison of value of a third feature similarity metric with a second threshold value such that the value of the third feature similarity metric is less than the second threshold value for the new set of input data;
   iteratively performing steps of feature extraction, optimization level based sampling, graph construction and applying the cost function based thresholding criterion on constructed graph for the new set of input data to obtain a second optimal set of clusters; and
   dynamically updating the system database by adaptively learning each information pertaining to the second optimal set of clusters obtained for the new set of input data.

3. The processor implemented method of claim 1, wherein the first feature similarity metric is computed as an inner product between the plurality of features of a pair of sample data connected to each of the plurality of edges of the graph.

4. The processor implemented method of claim 1, wherein the second feature similarity metric is computed as an inner product of the plurality of features of each of the plurality of incoming input data and a plurality of features of each cluster comprised in the set of clusters.

5. The processor implemented method as claimed in claim 2, wherein the third feature similarity metric is computed as an inner product of a plurality of features of each input data comprised in the set of incoming input data and the plurality of features of each cluster comprised in the set of clusters.

6. System, comprising:
   a memory storing instructions;
   one or more communication interfaces; and
   one or more hardware processors coupled to the memory via the one or more communication interfaces, wherein the one or more hardware processors are configured by the instructions to:

receive, a plurality of incoming input data pertaining to one or more domains, from a user;

extract, using one or more machine learning models, a plurality of features from the plurality of incoming input data based on a transfer learning approach, wherein the plurality of features of the incoming input data are image features from an images data set, an audio and a video, wherein when the incoming input data is the audio, then the audio is converted to spectrogram images and passed for feature extraction using a deep learning method, wherein when the incoming input data is the video, then frames of the video are extracted prior to applying feature extraction;

determine, a set of sampled data from the plurality of incoming input data based on an optimization level, wherein the set of sampled data provides a reduced dataset, reduce a processing time of the hardware processors;

obtain, a graph comprising a plurality of nodes and a plurality of edges constructed from the set of sampled data, wherein each of the plurality of nodes represents a sample data comprised in the set of the sampled data and a weight indicative of a first feature similarity metric is assigned to each of the plurality of edges;

determine, a first optimal set of clusters for the set of sampled data using a cost function-based thresholding criterion applied on the graph, wherein step of applying the cost function based thresholding criterion on the graph further comprising:

generating, based on a thresholding criterion, a set of thresholded graphs from the graph corresponding to a set of threshold values iterated upon a predefined range with a predefined step-size, wherein the thresholding criterion includes removing a set of edges from the graph which are assigned with a weight less than a pre-selected threshold value;

determining, a plurality of subgraphs for each of the thresholded graph from the set of thresholded graphs, based on disconnected subgraph concept of graph theory, wherein the plurality of subgraphs is disconnected from each other subgraph;

computing, using a cost function, a cost score corresponding to each of the plurality of subgraphs for each of the set of thresholded graphs to obtain a final cost score for each of the set of thresholded graphs;

identifying a first threshold value from the set of threshold values such that the first threshold value corresponds to a thresholded graph from the set of thresholded graphs having maximum value of the final cost score; and determining the plurality of subgraphs associated with the thresholded graph having maximum value of the final cost score, wherein the plurality of subgraphs is indicative of the first optimal set of clusters; and assign, each of the plurality of incoming input data to a cluster from the first optimal set of clusters based on a maximum value of a second feature similarity metric.

7. The system of claim 6, further configured by instructions to:

determine, by querying a system database, whether a set of incoming input data is a new set of input data based on a comparison of value of a third feature similarity metric with a second threshold value such that the value of the third feature similarity metric is less than the second threshold value for the new set of input data;

iteratively perform steps of feature extraction, optimization level based sampling, graph construction and applying the cost function based thresholding criterion on constructed graph for the new set of input data to obtain a second optimal set of clusters; and dynamically update the system database by adaptively learning each information pertaining to the second optimal set of clusters obtained for the new set of input data.

8. The system of claim 6, wherein the first feature similarity metric is computed as an inner product between the plurality of features of a pair of sample data connected to each of the plurality of edges of the graph.

9. The system of claim 6, wherein the second feature similarity metric is computed as an inner product of the plurality of features of each of the plurality of incoming input data and a plurality of features of each cluster comprised in the set of clusters.

10. The system of claim 7, wherein the third feature similarity metric is computed as an inner product of a plurality of features of each input data comprised in the set of incoming input data and the plurality of features of each cluster comprised in the set of clusters.

11. One or more non-transitory computer readable mediums comprising one or more instructions which when executed by one or more hardware processors cause:

receiving, a plurality of incoming input data pertaining to one or more domains, from a user;

extracting, using one or more machine learning models, a plurality of features from the plurality of incoming input data based on a transfer learning approach, wherein the plurality of features of the incoming input data are image features from an images data set, an audio and a video, wherein when the incoming input data is the audio, then the audio is converted to spectrogram images and passed for feature extraction using a deep learning method, wherein when the incoming input data is the video, then frames of the video are extracted prior to applying feature extraction;

determining, a set of sampled data from the plurality of incoming input data based on an optimization level, wherein the set of sampled data provides a reduced dataset, reduce a processing time of the hardware processors;

obtaining, a graph comprising a plurality of nodes and a plurality of edges constructed from the set of sampled data, wherein each of the plurality of nodes represents a sample data comprised in the set of the sampled data and a weight indicative of a first feature similarity metric is assigned to each of the plurality of edges;

determining, a first optimal set of clusters for the set of sampled data using a cost function-based thresholding criterion applied on the graph, wherein step of applying the cost function based thresholding criterion on the graph further comprising:

generating, based on a thresholding criterion, a set of thresholded graphs from the graph corresponding to a set of threshold values iterated upon a predefined range with a predefined step-size, wherein the thresholding criterion includes removing a set of edges from the graph which are assigned with a weight less than a pre-selected threshold value;

determining, a plurality of subgraphs for each of the thresholded graphs from the set of thresholded graphs, based on disconnected subgraph concept of graph theory, wherein the plurality of subgraphs are disconnected from each other subgraph;

computing, using a cost function, a cost score corresponding to each of the plurality of subgraphs for each of the set of thresholded graphs to obtain a final cost score for each of the set of thresholded graphs;

identifying a first threshold value from the set of threshold values such that the first threshold value corresponds to a thresholded graph from the set of thresholded graphs having maximum value of the final cost score; and determining the plurality of subgraphs associated with the thresholded graph having maximum value of the final cost score, wherein the plurality of subgraphs are indicative of the first optimal set of clusters; and assigning, each of the plurality of incoming input data to a cluster from the first optimal set of clusters based on a maximum value of a second feature similarity metric.

* * * * *